United States Patent
Butzmann et al.

(10) Patent No.: US 10,056,654 B2
(45) Date of Patent: Aug. 21, 2018

(54) ELECTROCHEMICAL ENERGY STORE AND METHOD FOR CONNECTING CELLS OF AN ELECTROCHEMICAL ENERGY STORE

(71) Applicant: Robert Bosch GmbH, Stuttgart (DE)

(72) Inventors: Stefan Butzmann, Schalksmühle (DE); Philipp Hillenbrand, Neuffen (DE)

(73) Assignee: Robert Bosch GmbH, Stuttgart (DE)

( * ) Notice: Subject to any disclaimer, the term of this patent is extended or adjusted under 35 U.S.C. 154(b) by 156 days.

(21) Appl. No.: 15/129,894

(22) PCT Filed: Mar. 16, 2015

(86) PCT No.: PCT/EP2015/055405
§ 371 (c)(1),
(2) Date: Sep. 28, 2016

(87) PCT Pub. No.: WO2015/150059
PCT Pub. Date: Oct. 8, 2015

(65) Prior Publication Data
US 2017/0141435 A1   May 18, 2017

(30) Foreign Application Priority Data

Mar. 31, 2014  (DE) .................. 10 2014 205 913

(51) Int. Cl.
*H01M 2/00* (2006.01)
*H01M 10/42* (2006.01)
*H01M 10/44* (2006.01)

(52) U.S. Cl.
CPC ..... *H01M 10/425* (2013.01); *H01M 10/4207* (2013.01); *H01M 10/441* (2013.01); *H01M 2010/4271* (2013.01)

(58) Field of Classification Search
CPC ............................ H01M 10/425; H02J 7/00
(Continued)

(56) References Cited

U.S. PATENT DOCUMENTS 9,793,581 B2 * 10/2017 Henrici ............... H01M 10/482
9,869,725 B2 *  1/2018 Chaturvedi ........ G01R 31/3637
(Continued)

FOREIGN PATENT DOCUMENTS

| DE | 102011002548 | 7/2012 |
| DE | 102011075376 | 11/2012 |
| DE | 102011054790 | 4/2013 |

OTHER PUBLICATIONS

International Search Report for Application No. PCT/EP2015/055405 dated Jun. 1, 2015 (English Translation, 2 pages).

*Primary Examiner* — Abdullah Riyami
*Assistant Examiner* — Nader Alhawamdeh
(74) *Attorney, Agent, or Firm* — Michael Best & Friedrich LLP

(57) ABSTRACT

Disclosed are an electrochemical energy store and a method for connecting cells of an electrochemical energy store. According to the invention, the following steps are carried out: determination of a first set-point for an output voltage of the energy store; determination of a first probability ($P_{on}$) for connecting a first cell, the first probability ($P_{on}$) predetermining the connection of the first cell to the electrochemical energy store; definition of a first condition limit value and a second condition limit value for all cells of the electrochemical energy store; calculation of a first condition value for the first cell, and independently of the first probability ($P_{on}$), non-connection of the first cell to the electrochemical energy store at a first time, if the condition value lies below the first condition limit value.

10 Claims, 3 Drawing Sheets

(58) Field of Classification Search
USPC .................................................. 307/10.1
See application file for complete search history.

(56) References Cited

U.S. PATENT DOCUMENTS

| | | | |
|---|---|---|---|
| 2009/0027006 A1* | 1/2009 | Vezzini | H02J 7/0014 320/118 |
| 2010/0203397 A1* | 8/2010 | Thiemann-Handler | H01M 10/052 429/324 |
| 2010/0261048 A1* | 10/2010 | Kim | H01M 10/44 429/150 |
| 2011/0213509 A1 | 9/2011 | Onnerud et al. | |
| 2013/0241567 A1* | 9/2013 | Boehm | G01R 31/3679 324/434 |
| 2013/0271068 A1 | 10/2013 | Komoda et al. | |
| 2014/0035361 A1* | 2/2014 | Schmidt | B60L 11/1803 307/10.1 |
| 2017/0141435 A1* | 5/2017 | Butzmann | H01M 10/425 |

\* cited by examiner

ELECTROCHEMICAL ENERGY STORE AND METHOD FOR CONNECTING CELLS OF AN ELECTROCHEMICAL ENERGY STORE

BACKGROUND OF THE INVENTION

The present invention relates to an electrochemical energy store and a method for connecting cells of an electrochemical energy store. The present invention particularly relates to improved logics when selecting cells to participate in an output voltage of the energy store.

The connection of individual electrochemical storage cells ("cells") of an electrochemical energy store in series or in parallel in order in each case to achieve desired source characteristics is known from the prior art. A series circuit of electrochemical energy stores increases the maximum terminal voltage, whereas a parallel circuit increases the maximum terminal current. In order to satisfy unequal states of charge and states of health of the individual cells of the electrochemical energy store, it is proposed in the prior art that the cells are allowed to participate in the energy output and/or the energy intake of the electrochemical energy store on the basis of probability functions. In this context, the prior art also relates to smart cells which comprise an electrochemical cell, two power semiconductors or respectively power transistors in a half-bridge configuration as well as a cell monitoring circuit having an integrated control unit. FIG. 1 shows a circuit diagram of one such smart cell, also referred to as an intrinsically safe battery cell. A cell monitoring circuit 2 as well as an arrangement of power electronic switches is provided in parallel to cell 3. The latter comprises semiconductor switching diodes 4, 7 connected in series as well as diodes 5, 6 which are likewise connected in series and are provided in reverse orientation to the semiconductor switching diodes 4, 7. The semiconductor switching diode 4 and the diode 5 thereby form an upper portion of the half-bridge, the semiconductor switching diode 7 and the diode 6 forming a lower portion of the half-bridge. A connection provided between the semiconductor switching diodes 4, 7 and the diodes 5, 6 forms the output of the smart cell 1 jointly with a connection 9 at the common switching point of the cell 3, the cell monitoring circuit 2 and the lower half-bridge 6, 7. During normal operation, the cell 3 is switched on using the upper portion of the half-bridge 4, 5, whereas the lower portion of the half-bridge 6, 7 is used to switch off the cell 3. As soon as the cell reaches an impermissible state (e.g. maximum minus or minimum voltage or respectively maximum temperature or minimum temperature), whereby the safety of the smart cell 1 is impaired, the upper portion of the half-bridge 4, 5 is switched off, while the lower portion 6, 7 is switched on. An alternative (not depicted) to the smart cell 1 depicted in FIG. 1 uses a full-bridge which makes a reversal of the polarity of the electric voltage possible. In order to achieve a predefined value of a terminal voltage $V_{set\_total}$, it is proposed according to the prior art that a control unit of the electrochemical store allows one or a plurality of smart cells 1 to be connected in series or in parallel to one another while said smart cells are each switched on with a predefined probability $P_{on}$.

FIG. 2 shows a flow diagram to illustrate the generation of the output voltage $V_{actual\_total}$ using a switch-on probability for the smart cell 1. In the flow diagram 10, an actual default value for the voltage $V_{set\_total}$ within a control unit 11 is multiplied by a correction value 12. An additional value is added to the result. The additional value consisting of the difference between the default value $V_{set\_total}$ and an actual terminal voltage value $V_{actual\_total}$, which is multiplied by a second correction factor 14, is added in an adder 13. In the result, a switch-on probability $P_{on}$ is applied to a plurality 16 of battery cells, which leads to the actual voltage value $V_{actual\_total}$ that can be applied to a load 17.

In FIG. 3, a schematic circuit diagram of a series circuit of intrinsically safe battery cells 21, 22, 23, 2n is depicted. A control unit 24 sets defaults for the cells 21, 22, 23, 2n with regard to a switch-on probability $P_{on}$ and/or a switch-off probability $P_{off}$. The control unit 24 receives the terminal voltage $V_{actual\_total}$ dropping across the load 17 as an input variable. It is an aim of the present invention to carry out the operation, in particular the balancing (cell state balancing) of a generic electrochemical energy store faster and more efficiently.

SUMMARY OF THE INVENTION

According to the invention, the aim mentioned above is met by a charge balancing being carried out between cells of an electrochemical energy store, during which the battery cells prioritize the switch-on behavior thereof using a given probability (switch-on probability or disconnect probability) in order to generate the predefined output total voltage of the energy store. The prioritization when using the cells can be determined on the basis of a state of charge (SOC) and/or on the basis of a state of health (SOH) of the cell. A method for connecting cells of an electrochemical energy store comprising the following steps is correspondingly disclosed. In a first step, a first set-point for an output voltage of the energy store is determined. This can, for example, be a total terminal voltage, which is determined on the basis of the operating state of an electric consumer ("load") connected to the energy store. In a second step, a first probability for connecting a first cell of the electrochemical energy store is determined, the first probability pre-determining the connection of the first cell to the electro chemical energy store. In other words, the proportion of the first cell of the total power balance of the energy store is determined on the basis of the first probability. In a further step, a first condition limit value and a second condition limit value are defined for all cells of the electrochemical energy store. A reference value for a capacity of a respective cell is to be understood by a condition limit value. In a following step, a first condition value for the first cell is calculated, and independently of the first probability, a participation of the first cell in a power balance of the energy store is prevented if the condition value lies below the first condition limit value. In other words, the first cell is not additionally connected to a strand of the energy store at least for a predefined operating range (subsequently to or continuously up to the first point in time). In this way, the share of the cells of the energy store in a power balance can be prioritized as a function of the condition value of said cells of the energy store.

The method according to the invention furthermore comprises connecting the first cell to the electrochemical energy store at a second, later point in time in accordance with the first probability. In so doing, the second point in time is, for example, a temporally subsequent clock cycle, with which the cells of the electrochemical energy store are actuated by a superordinate control unit for the purpose of balancing or respectively of controlling the energy output. The first cell is connected on condition of the condition value of the first cell lying below the first condition limit value and above the second condition limit value. In other words, provided that the condition value of the first cell does not already lie above the first condition value, a check is made at the latest at the second point in time whether said condition value of the first cell exceeds the first condition limit value. Provided this too is not the case, the first cell remains disconnected. Provided the condition value of the first cell does, however, lie in the aforementioned condition limit value interval, the first cell is now connected. In this way, a condition value-dependent prioritization can be achieved when connecting or respectively using the first cell.

Provided the condition value of the first cell is very good and lies above the first condition limit value, the first cell can, in accordance with the first probability, be connected to the electrochemical energy store already at the first point in time. In so doing, the first condition limit value is associated with a better capacity than the second condition limit value. For example, the first condition limit value can be associated with a highest capacity category in one exemplary embodiment. In this way, a very efficient cell can be highly prioritized for use in the electrochemical energy store.

Provided (e.g. as a result of a change in operating state of a consumer connected to the electrochemical energy store) the first set-point of the output voltage changes, a second set-point of the output voltage of the energy store can be determined. At a third point in time, the first cell can now be separated from the electrochemical energy store using a second probability, provided the condition value of the first cell lies below the second condition limit value. In so doing, the second probability can be determined in response to determining the second set-point and can be provided as a basis for the method according to the invention in order to control the output voltage according to need. By determining the second probability, the condition limit value to be used can be redefined. In addition to increasing a total probability for connecting a respective cell, it can, for example, also be necessary to increase the number of cells participating in balancing or power exchange even if this done at the expense of a total service life of a cell or of the electrochemical energy store.

At a fourth, later point in time, the first cell can correspondingly be disconnected from the electrochemical energy store with a second probability, provided the condition value thereof lies below the first condition limit value and above the second condition limit value. This can, for example, then be the case if the required number of participating cells has fallen so that now cells having a better condition value can be excluded from the power exchange. Within the scope of the above description, the ordinal numbers: first, second, third, fourth point in time can be arranged chronologically in ascending order. Something similar can apply to the condition limit values, wherein a first condition limit value is associated with the best condition and a condition limit value having a higher ordinal number is correspondingly associated with a worse condition.

The condition value and the condition limit value can be associated with a charge state, which is denoted in English as "state of charge" (SOC) and/or a health status, which is denoted in English as "state of health" (SOH). In other words, the previously stated quality criteria can have an influence on the condition value used according to the invention. Said quality criteria are thereby suited to extending the service life of the individual cells and thus the total service life of the electrochemical energy store when used in the method according to the invention. In addition, the capacity or efficiency of the energy store can be maintained over an operating period that is as long as possible. The connection or respectively the disconnection of the cell to or from the charge exchange can, for example, take place via a half-bridge, which is contained within the cell designed as a smart cell (intelligent cell).

An output voltage of the electrochemical energy store can be determined between the points in time, which, for example, can correspond to pulses of a clock of a control unit; and the first probability and/or the second probability can be changed particularly when an actual output voltage deviates from a predefined set-point output voltage. In this way, a total power output or power consumption can be adapted to the changed boundary conditions.

According to a second aspect of the present invention, an electrochemical energy store is disclosed which has at least two cells each having a half-bridge ("smart cells") and a control unit that can be designed as a microcontroller, nanocontroller or something similar and can be associated with all the cells of the electrochemical energy store. In other words, the control unit can, for example, provide the clock signal (points in time) and/or respective probabilities in accordance with current condition variables (actual variables) and operating state conditioned target variables (set-point variables). In this way, the electrochemical energy store is equipped to carry out a method as said method is described above in detail. The features, feature combinations as well as the advantages ensuing therefrom correspond clearly to those described in connection with the method according to the invention such that reference is made to the embodiments mentioned above in order to avoid repetition.

BRIEF DESCRIPTION OF THE DRAWINGS

Exemplary embodiments of the invention are described below in detail with reference to the accompanying drawings. In the drawings.

DETAILED DESCRIPTION

Figure 1:
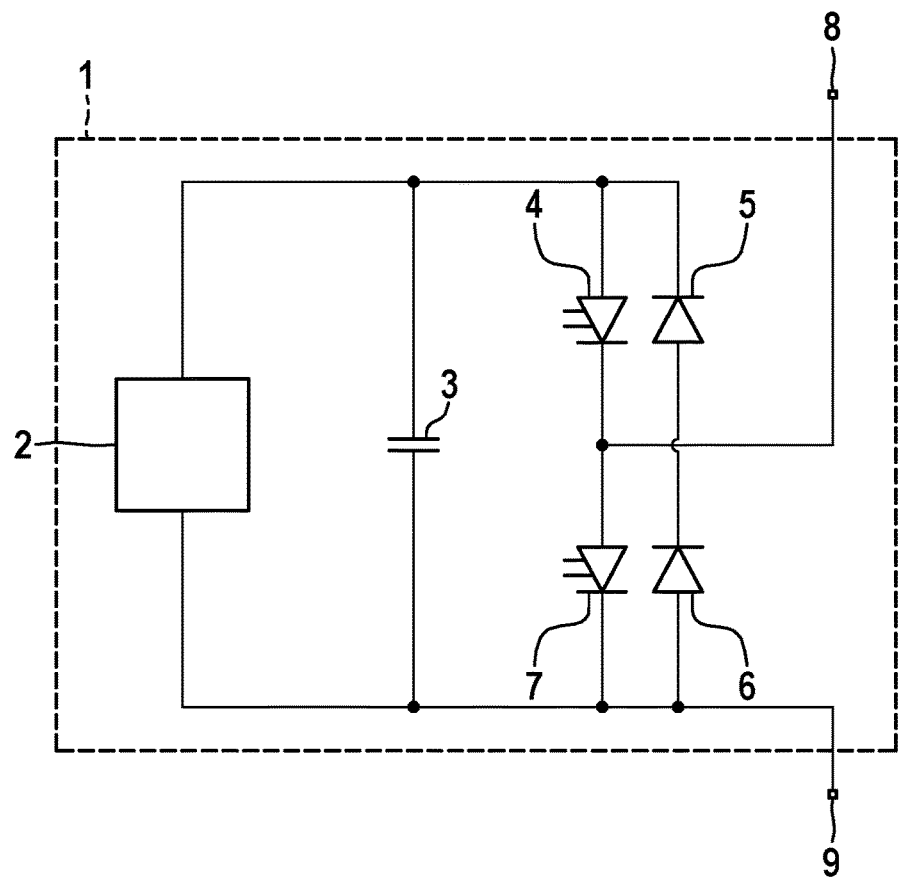
FIG. 1 shows a schematic circuit diagram of a smart cell.
Figure 2:
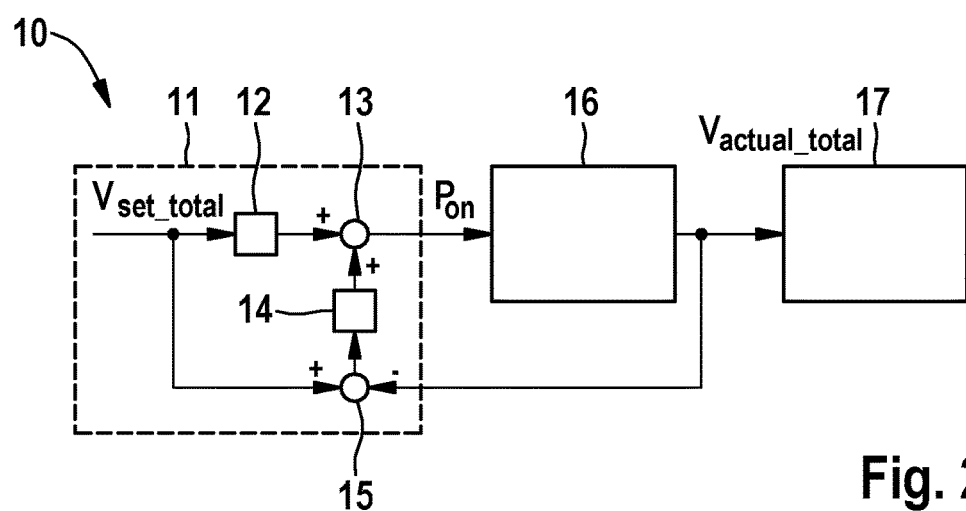
FIG. 2 shows a schematic flow diagram for defining the output voltage of the energy store.
Figure 3:
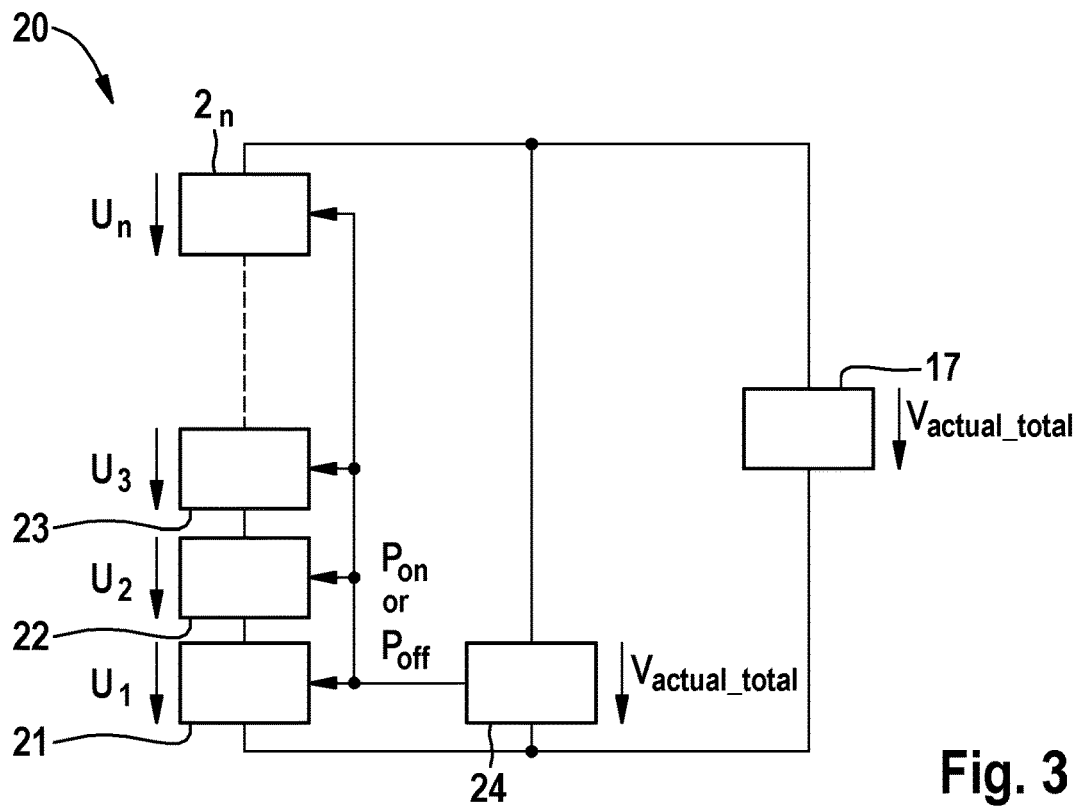
FIG. 3 shows a basic circuit diagram of an intrinsically safe battery cell.
Figure 4:
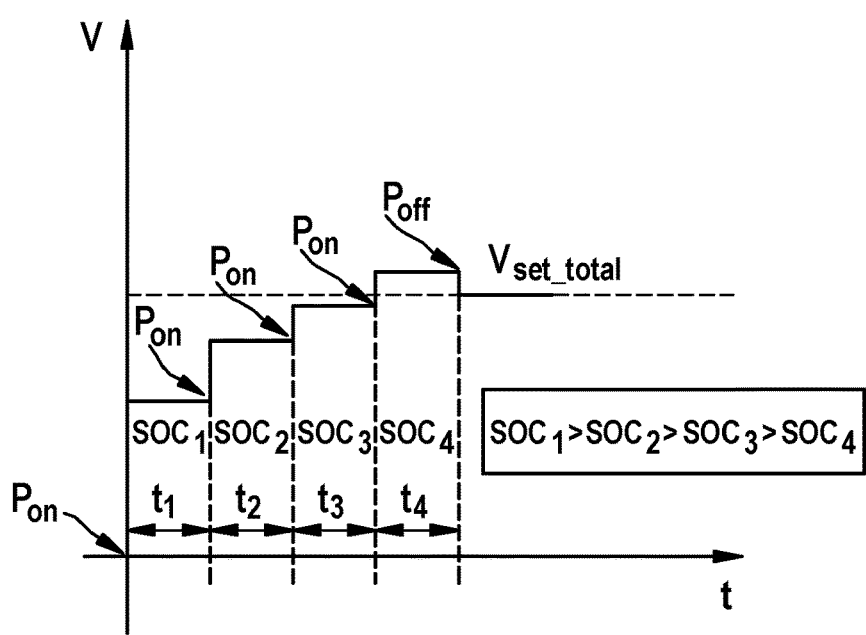
FIG. 4 shows a voltage/time diagram to illustrate the charge state-dependent, hierarchical switching of individual cells.

FIG. 4 shows a time diagram of an output voltage of an electrochemical energy store operated according to the invention. At the origin of the axis, the clock pulse for the switch-on operation is given with a probability $P_{on}$, in response to which all modules are switched on which have a best possible $SOC_1$. This can even be an individual cell. Under certain circumstances, none of the cells contained in the electrochemical energy store fulfill this condition. After a time period $t_1$ has elapsed, each electrochemical cell, which has a $SOC_2$, is connected up with a probability $P_{on}$. This can also be all the cells, only individual cells, a single cell or no cell (depending on the configuration of the electrochemical energy store). After a second time period $t_2$ has elapsed, which can be identical to the time period $t_1$, cells are switched on corresponding to a switch-on probability $P_{on}$, which satisfy the condition $SOC_3$. After a time period $t_3$ has again elapsed, all cells which meet the condition $SOC_4$ as a minimum charge state are connected up with a probability $P_{on}$. So many electrochemical cells have now been added to the strand that the predefined total voltage $V_{set\_total}$ is achieved using the switch-on probability $P_{on}$ and is even exceeded. After a further time period $t_4$ has elapsed, a disconnect probability $P_{off}$ is correspondingly defined, by means of which individual cells of the used cells are disconnected and the total output voltage $V_{set\_total}$ is subsequently maintained. The method presented makes it possible to reduce the required signalization cost and effort in the following manner. Each cell in the composite receives a switch-on probability $P_{on}$ from a superordinate control unit independently of a respective state (SOC, SOH or something similar). The cells switch themselves on using the switch-on probability $P_{on}$ or (provided that they are arranged further down in the SOC hierarchy) remain in a switched-off state in accordance with the respective charge states or health statuses thereof, which are predefined and known to the individual cell or respectively in the controllers thereof. Different ways are conceivable for controlling this process, of which two are described below. In one example, it is determined at rest with each of the cells of the electrochemical energy store whether the predefined total output voltage $V_{set\_total}$ has now been achieved. If this is the case and if the time or respectively the SOC class of a cell being considered has not yet been achieved, the cell remains in the disconnected state. If the time of the cell has come or the SOC condition thereof has been achieved, said cell participates in the energy exchange in accordance with the switch-on probability $P_{on}$. Alternatively, control commands from a control unit of the electrochemical energy store can be sent to the individual cells, by means of which a condition limit value (SOC) to be currently used is communicated to the cells. Only if the condition value associated with the one considered cell corresponds to a called up condition limit value, does the considered cell participate in the energy exchange in the succeeding clock cycle with the probability $P_{on}$. The fact that a predefined output voltage has been successfully achieved or even exceeded can also accordingly be determined by the individual cells or be communicated via a superordinate control unit. In accordance with a current operating state, only those cells then participate which satisfy a predefined condition with regard to their own SOC. The exact setting of the voltage $V_{set\_total}$ occurs subsequently, for example, by means of the switch-on probability $P_{on}$ and the disconnect probability $P_{off}$ which does not have to necessarily be constant over the time. The number of SOCs or SOC classes depicted in FIG. 4 as well as the equidistance of the time segments $t_i$ are to be understood as examples and not to be interpreted in a limiting manner. In one exemplary embodiment, the disconnect probability $P_{off}$ can be used in reverse order as a function of the respective condition value of the cells. In other words, the weakest cell ($SOC_4$) can be disconnected as the first cell with the disconnect probability $P_{off}$ when a demand is made for disconnecting individual cells; whereas a second cell, which has an SOC index 3 and is thus more efficient than the previously disconnected cell, is disconnected with the disconnect probability $P_{off}$ in a succeeding clock cycle (provided that there is the corresponding necessity for generating the output voltage). In other words, the invention discloses for the purpose of increasing efficiency and for extending the service life of the individual cells or respectively of the energy store that the cell is prioritized corresponding to its own condition whether it participates in a required energy output with a respective probability prematurely, at a later point in time or not at all. An overuse of weak cells is prevented by the inventive prioritization on the basis of the capacity of the cells. In addition, switching processes are reduced which reduces the power loss. In this way, an undesired heating of the battery cells can also be reduced.

Figure 5:
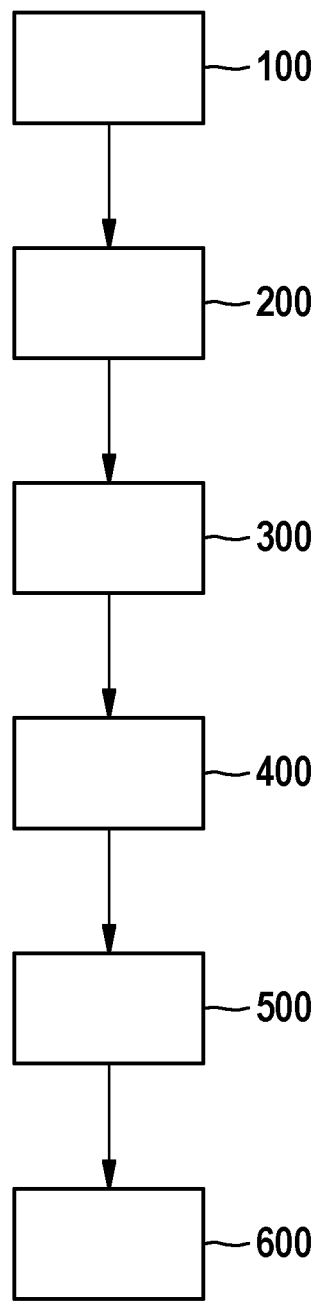
FIG. 5 shows a flow diagram illustrating steps of an exemplary embodiment of a method according to the invention.

FIG. 5 shows a flow diagram, illustrating steps of an exemplary embodiment of a method according to the invention. In step 100, a first set-point for an output voltage of the energy store is determined. This can, for example, be determined as a function of a desired power consumption of a consumer connected to the energy store. In step 200, a first probability for connecting a first cell is subsequently determined, the first probability pre-determining the connection of the first cell to the electrochemical energy store. The first probability can furthermore be associated with a plurality of cells or with all of the cells of the electrochemical energy store. In step 300, a first condition limit value and a second condition limit value are defined for all the cells of the electrochemical energy store. This can take place at an earlier point in time and, for example, be preset at the factory. Upon commencing operation, a control unit of the electrochemical energy store can alternatively or additionally communicate a corresponding classification to the cells in the composite. In step 400, a first condition value is determined for the first cell. This gives information about the capacity of the first cell. Independently of the first probability, the first cell is not yet connected to the electrochemical energy store at a first point in time, provided the condition value thereof lies below the first condition limit value. In step 500, the first cell is connected up to the electrochemical energy store, provided the condition value thereof lies below the first condition limit value and above the second condition limit value. Because the required output voltage has been exceeded with the connection of the first cell, said first cell is disconnected from the electrochemical energy store in step 600 with a second probability at a third point in time, provided the condition value thereof lies below the second condition limit value. In other words, the first cell in fact continues to be used at the third point in time for controlling the output voltage or respectively for balancing. This takes place, however, using the first probability (switch-on probability) and the second probability (disconnect probability). In this way, all the cells of the electrochemical energy store can be prevented in the course of the balancing or respectively in the course of the power output from producing switching losses and generating signalization cost and effort.

Even if the aspects according to the invention and the advantageous embodiments have been described in detail on the basis of the exemplary embodiments in combination with the attached figures in the drawings, modifications and combinations of features of the exemplary embodiments depicted are possible for the person skilled in the art without departing from the scope of the present invention, the protective scope of which is defined by the accompanying claims.

The invention claimed is:

1. A method for connecting cells (3, 21, 22, 23, 2n) of an electrochemical energy store (1) comprising the following steps:
   determining (100) a first set-point for an output voltage of the energy store (1),
   determining (200) a first probability ($P_{on}$) for connecting a first cell (3, 21, 22, 23, 2n), the first probability ($P_{on}$) pre-determining the connection of the first cell (3, 21, 22, 23, 2n) to the electrochemical energy store (1),
   defining (300) a first condition limit value and a second condition limit value for all cells (3, 21, 22, 23, 2n) of the electrochemical energy store (1), calculating (400) a first condition value for the first cell (3, 21, 22, 23, 2n), and independently of the first probability ($P_{on}$), not connecting (500) the first cell (3, 21, 22, 23, 2n) to the electrochemical energy store (1) at a first point in time, if the condition value lies below the first condition limit value.

2. The method according to claim 1, further comprising:

connecting (500) the first cell (3, 21, 22, 23, 2n) to the electrochemical energy store (1) at a second, later point in time in accordance with the first probability ($P_{on}$), provided the condition value (SOC, SOH) thereof lies below the first condition limit value and above the second condition limit value.

3. The method according to claim 1, further comprising the step of:

connecting (600) the first cell (3, 21, 22, 23, 2n) to the electrochemical energy store (1) at a first, later point in time in accordance with the first probability ($P_{on}$), provided the condition value (SOC, SOH) thereof lies above the first condition limit value.

4. The method according to claim 1, further comprising the steps:

determining a second set-point of the output voltage of the energy store (1), said second set-point being changed with respect to the first set-point of the output voltage, and disconnecting the first cell (3, 21, 22, 23, 2n) of the electrochemical energy store (1) with a second probability at a third point in time, provided the condition value thereof lies below the second condition limit value.

5. The method according to claim 4 further comprising the step of:

disconnecting the first cell (3, 21, 22, 23, 2n) from the electrochemical energy store (1) with a second probability at a fourth, later point in time, provided the condition value (SOC, SOH) lies below the first condition limit value and above the second condition limit value.

6. The method according to claim 1, wherein the condition value (SOC, SOH) and the condition limit value are associated with a charge state (SOC), a health status (SOH), or both a charge state and a health status.

7. The method according to claim 1, wherein the first cell (3, 21, 22, 23, 2n) is connected via a half-bridge of the first cell (3, 21, 22, 23, 2n).

8. The method according to claim 1, wherein a change in the first probability ($P_{on}$), a change in a second probability, or a change in the first probability ($P_{on}$) and the second probability are determined between the points in time.

9. The method according to claim 1, wherein the temporal position of one of the points in time is predefined relative to a further point in time.

10. An electrochemical energy store (1) comprising:

at least two cells (3, 21, 22, 23, 2n) having in each case a half-bridge, and a control unit (24), wherein the electrochemical energy store (1) is configured to determine (100) a first set-point for an output voltage of the energy store (1), determine (200) a first probability ($P_{on}$) for connecting a first cell (3, 21, 22, 23, 2n), the first probability ($P_{on}$) pre-determining the connection of the first cell (3, 21, 22, 23, 2n) to the electrochemical energy store (1), define (300) a first condition limit value and a second condition limit value for all cells (3, 21, 22, 23, 2n) of the electrochemical energy store (1), calculate (400) a first condition value for the first cell (3, 21, 22, 23, 2n), and independently of the first probability ($P_{on}$), not connect (500) the first cell (3, 21, 22, 23, 2n) to the electrochemical energy store (1) at a first point in time, if the condition value lies below the first condition limit value.

* * * * *